(12) United States Patent
Zhang et al.

(10) Patent No.: US 11,887,218 B2
(45) Date of Patent: Jan. 30, 2024

(54) IMAGE OPTIMIZATION METHOD, APPARATUS, DEVICE AND STORAGE MEDIUM

(71) Applicant: Samsung Electronics Co., Ltd., Suwon-si (KR)

(72) Inventors: Jianxing Zhang, Beijing (CN); Zikun Liu, Beijing (CN); Chunyang Li, Beijing (CN); Jian Yang, Beijing (CN); Wei Wen, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/528,051

(22) Filed: Nov. 16, 2021

(65) Prior Publication Data

US 2022/0076459 A1 Mar. 10, 2022

Related U.S. Application Data

(63) Continuation of application No. PCT/KR2020/004984, filed on Apr. 13, 2020.

(30) Foreign Application Priority Data

May 16, 2019 (CN) .......................... 201910407866.7
Dec. 27, 2019 (CN) .......................... 201911372694.0

(51) Int. Cl.
*G06T 11/00* (2006.01)
*G06T 3/40* (2006.01)
*G06T 5/00* (2006.01)

(52) U.S. Cl.
CPC .......... *G06T 11/001* (2013.01); *G06T 3/4046* (2013.01); *G06T 5/001* (2013.01)

(58) Field of Classification Search
CPC ..... G06T 11/001; G06T 5/001; G06T 3/4046; G06T 5/00; G06T 5/005;
(Continued)

(56) References Cited

U.S. PATENT DOCUMENTS

2012/0075498 A1* 3/2012 Watanabe ................ H04N 5/20
348/222.1
2012/0307116 A1* 12/2012 Lansel ................ H04N 25/134
348/E9.005
(Continued)

FOREIGN PATENT DOCUMENTS

CN 109389552 A 2/2019
KR 10-2018-0108322 A 10/2018
KR 10-2019-0040586 A 4/2019

OTHER PUBLICATIONS

Jun Young Cheong et al. "Deep CNN-Based Super-Resolution Using External and Internal Examples" Aug. 2017, IEEE Signal Processing Letters, vol. 24, No. 8. (Year: 2017).*
(Continued)

*Primary Examiner* — Wesner Sajous

(57) ABSTRACT

The disclosure provides an image optimization method, system, and storage medium. The image optimization method includes extracting texture quality information from an input image. The texture quality information indicates a spatial distribution of texture quality in the input image. The image optimization method also includes performing, according to the texture quality information, texture restoration on a set region in the input image to generate a texture restored image.

13 Claims, 13 Drawing Sheets

(58) Field of Classification Search
CPC .. G06T 7/10–7/13; G06T 7/529; G06T 11/40;
G06T 7/40; G06T 2007/10024; G06T
2007/20172; G06T 2007/20192; G06T
2207/20228; G06T 2215/12; G06N 3/042;
G06N 3/045; G06N 3/08; G06N 3/0464;
G06N 5/00; G06N 3/00; G06N 7/01;
G09G 2340/0407; G09G 2340/0457;
G09G 5/02; H04N 13/128; H04N 13/133;
H04N 13/15; H04N 1/58; H04N 1/60;
H04N 1/6002; H04N 5/57; H04N 9/77
USPC ........................................................ 345/582
See application file for complete search history.

(56) References Cited

U.S. PATENT DOCUMENTS

| | | | |
|---|---|---|---|
| 2018/0286037 A1 | 10/2018 | Zaharchuk et al. | |
| 2018/0336666 A1* | 11/2018 | Kim | H04N 23/80 |
| 2019/0026608 A1 | 1/2019 | Hsieh et al. | |
| 2020/0098145 A1 | 3/2020 | Seo et al. | |
| 2020/0118279 A1* | 4/2020 | Abreu | G06V 10/7557 |
| 2020/0302297 A1* | 9/2020 | Jaganathan | G06F 18/2431 |
| 2022/0121884 A1* | 4/2022 | Zadeh | G06V 10/764 |

OTHER PUBLICATIONS

International Search Report and Written Opinion of the International Searching Authority dated Jul. 17, 2020, in connection with International Application No. PCT/KR2020/004984, 9 pages.

\* cited by examiner

FIG. 8
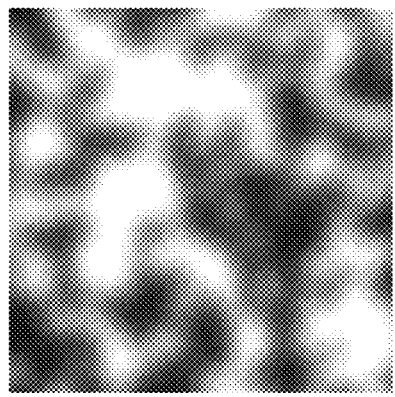
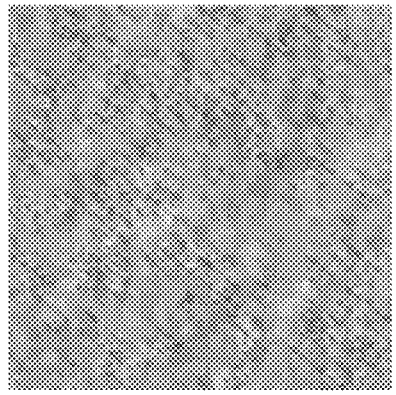

FIG. 12
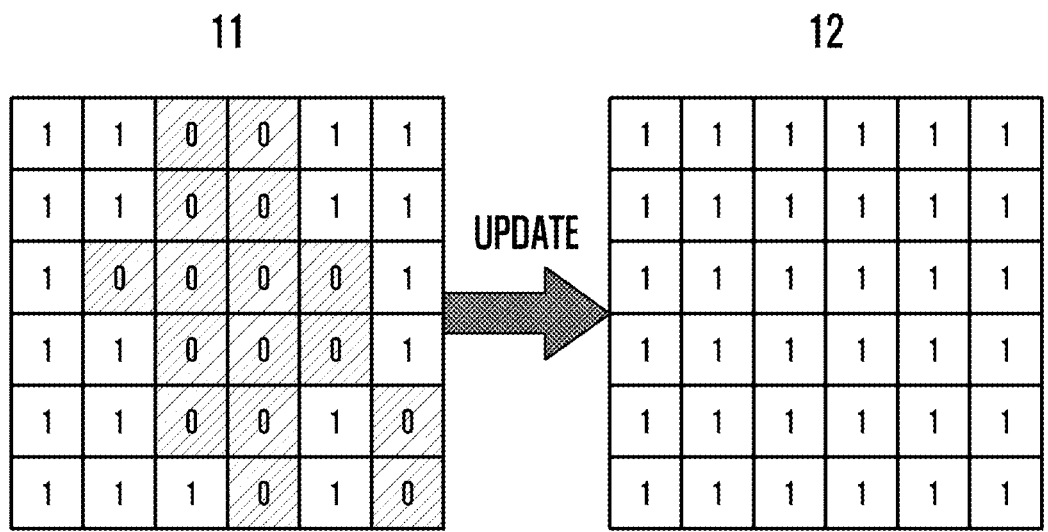
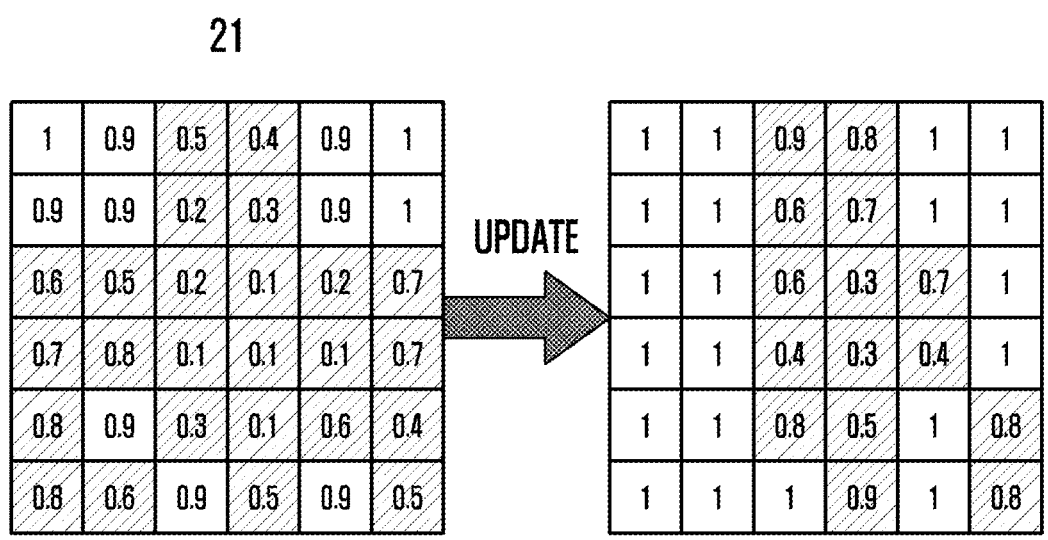

IMAGE OPTIMIZATION METHOD, APPARATUS, DEVICE AND STORAGE MEDIUM

CROSS-REFERENCE TO RELATED APPLICATIONS

This application is bypass continuation of International Application No. PCT/KR2020/004984, filed Apr. 13, 2020, which claims priority to Chinese Patent Application No. 201910407866.7, filed May 16, 2019, and Chinese Patent Application No. 201911372694.0, filed Dec. 27, 2019, the disclosures of which are incorporated by reference herein in their entirety.

BACKGROUND

1. Field

The disclosure relates to the field of image processing, and particularly, to an image optimization method, apparatus, device, and storage medium.

2. Description of Related Art

At present, competition in the smartphone market is fierce, and the photographing performance of the smartphone is one of the target factors of the fierce competition among the smartphone manufacturers. Continuously improving the image quality and improving the user's photographing experience have become an important goal of the smartphone manufacturers and their mobile phone lens accessory suppliers.

The image quality enhancement in fine granularity is an important means for improving the photographing performance of a mobile phone. Such enhancement includes, for example, a special quality enhancement for areas such as faces and hair of a human image and a dress of a person, and a special quality enhancement for specific background objects such as the sky, buildings, and green plants.

SUMMARY

An embodiment of the disclosure provides an image optimization method that not only recovers lost texture information in an image, but also enhances fragile texture information.

The disclosure provides an image optimization method comprising: extracting texture quality information from an input image, the texture quality information indicating a spatial distribution of texture quality in the input image; and performing, according to the texture quality information, texture restoration on a set region in the input image to generate a texture restored image.

According to an embodiment of the disclosure, the set region is an area where the texture quality degree is lower than a preset threshold value.

According to an embodiment of the disclosure, extracting the texture quality information from the input image includes performing feature extraction on the input image through a first convolutional neural network (CNN) to obtain the texture quality information.

According to an embodiment of the disclosure, the texture quality information includes a value between 0 and 1.

According to an embodiment of the disclosure, the texture quality information of a boundary position of the set region is smoothed if the texture quality information is binary information.

According to an embodiment of the disclosure, the texture restoration includes performing texture restoration on the set region through a second CNN based on the texture quality information.

According to an embodiment of the disclosure, the texture restoration includes performing texture restoration on the set region in the input image by using the texture quality information in the set region and the texture quality information outside the set region according to specific weights.

According to an embodiment of the disclosure, the texture restoration includes performing, according to a specific weight, convolution operations on all peripheral pixels surrounding a specific pixel to obtain a restored pixel value when a restoration operation is performed on a specific pixel position of the input image.

According to an embodiment of the disclosure, the image optimization method further includes performing texture feature enhancement on the texture restored image. Performing overall texture feature enhancement on the texture restored image is to enhance or further enrich the texture detail information of the input image.

According to an embodiment of the disclosure, the texture feature enhancement includes performing feature enhancement on the texture restored image via a residual network by using the texture restored image and a residual output by the residual network.

According to an embodiment of the disclosure, the residual network comprises concatenated convolutional units having a number less than a set number.

According to an embodiment of the disclosure, any one of the convolutional units of the residual network comprises a plurality of concatenated dilated convolutional layers.

According to an embodiment of the disclosure, at least two dilated convolutional layers of the plurality of dilated convolutional layers have different dilated ratios.

An image optimization apparatus includes a texture quality information extraction module for extracting texture quality information from an input image, the texture quality information indicating a spatial distribution of texture quality in the input image; and a texture restoration module for performing, according to the texture quality information, texture restoration on a set region in the input image to generate a texture restored image.

According to an embodiment of the disclosure, the texture quality information extraction module performs feature extraction on the input image through a first CNN to obtain the texture quality information.

According to an embodiment of the disclosure, the texture restoration module performs texture restoration on the set region through a second CNN based on the texture quality information.

According to an embodiment of the disclosure, the image optimization apparatus further includes a texture feature enhancement module, wherein the texture feature enhancement module is configured to perform overall texture feature enhancement on the texture restored image, wherein the overall texture feature enhancement is performed for enhancing or further enriching the texture detail information of the input image.

According to an embodiment of the disclosure, the texture detail feature enhancement module performs feature enhancement on the texture restored image via a residual network by using the texture restored image and a residual output by the residual network.

The disclosure provides an image optimization method including acquiring an input image; and performing texture feature enhancement on the input image via a residual network by using a residual output by the residual network and the input image.

The disclosure provides an image optimization apparatus including an image acquisition module for acquiring an input image; and a texture feature enhancement module for performing texture feature enhancement on the input image via a residual network by using a residual output by the residual network and the input image.

The disclosure provides an electronic device comprising a processor; and a memory connected to the processor and storing machine-readable instructions executable by the processor to cause the processor to perform any of the above methods.

The disclosure provides a non-transitory machine-readable storage medium having stored thereon machine-readable instructions executable by a processor to cause the processor to perform the method of any one of the above methods.

The technical solution provided in the disclosure integrates at least two tasks of image texture quality prediction, texture restoration, and texture feature enhancement, and performs a target image optimization to achieve a better image optimization effect.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Other features, objects, and advantages of the disclosure will become more apparent by reading the detailed description of non-limiting embodiments with reference to the following drawings.

FIG. 8 illustrates a diagram showing texture quality information according to an embodiment of the disclosure;

FIG. 12 illustrates a graph showing a comparison of an improved partial convolution with an existing partial convolution according to various embodiments of the disclosure.

DETAILED DESCRIPTION

Figure 1A:
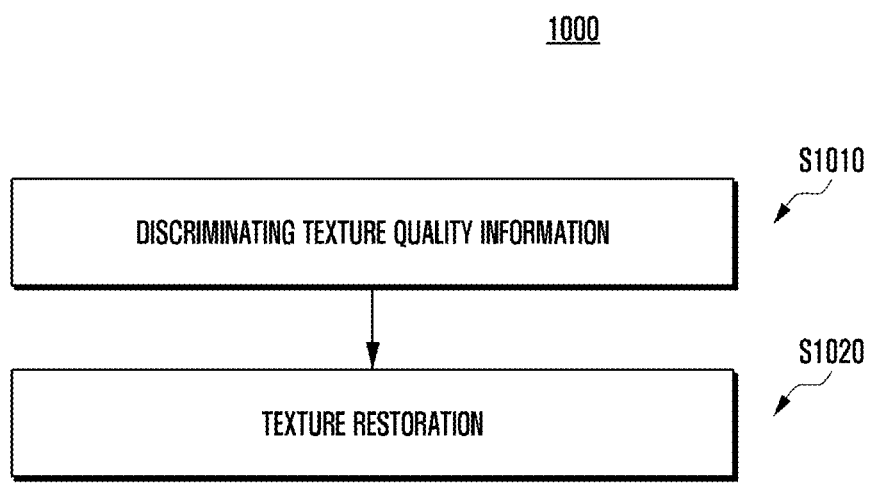
FIG. 1A illustrates a flowchart of an image optimization method according to an embodiment of the disclosure.

FIGS. 1A through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The disclosure is described in further detail below with reference to the accompanying drawings and embodiments. It is to be understood that the specific embodiments described herein are merely illustrative of the relevant technical concepts and are not restrictive of the technical concepts. It is also to be noted that, for ease of description, only parts related to the technical concepts of the disclosure are shown in the accompanying drawings. It is to be understood that, as used herein, unless otherwise indicated, the numeric words, such as "first," "second," and the like, are used merely to distinguish one element from another and do not denote importance or priority. For example, the first convolutional neural network (CNN) and the second CNN only indicate that they are different CNNs.

It should be noted that embodiments and features of the disclosure may be combined with each other without conflict. The disclosure will now be described in detail with reference to the accompanying drawings and embodiments.

In recent years, deep learning-based image optimization has made great progress. Image optimization, which is generally mentioned, is a broad concept and involves branch fields such as image restoration, image super-resolution, deblurring, de-noising, etc. Each of the above branch fields generally focuses on a particular problem. For example, image restoration mainly focuses on how to restore and reconstruct a damaged image or remove redundant objects in the image. Image super-resolution mainly focuses on how to recover a high-resolution image from a low-resolution image or image sequence. Image deblurring mainly focuses on how to eliminate the blurring phenomenon caused by hand shaking or out-of-focus. Image de-noising mainly focuses on how to eliminate noise generated in the image shooting or digitization process.

In addition, there are some studies on image overall quality improvement. These studies focus on the improvement of the brightness, hue, contrast of the image to make the image more vivid.

The image quality enhancement in fine granularity is an important means for improving the photographing performance of a mobile phone. For example, a special quality enhancement may be performed for areas such as faces and hair of a human image and a dress of a person. The special quality enhancement may be performed for specific background objects such as skies, buildings, and green plants. This optimization includes texture recovery for regions with missing textures and texture enhancement for regions with textures to make the image texture look clear and natural.

Images taken by a user through a terminal, such as a smartphone, often include a number of textures, such as wrinkles in a person's face, garment textures, periodic patterns in a building wall, rock textures in a mountain fault, and the like. The presentation of these textures reflects the detail information of the object and has an important effect on the expressiveness of the image. However, for various reasons, a captured image or a digitized image often lacks a partial texture. For example, the image captured by the image sensor will be transmitted to an image signal processor (ISP), and some post-processing in the ISP (for example, when the ambient light is insufficient, a large number of noises exist in the original image captured by the ISP, and the ISP performs de-noising processing on such an image) may reduce the texture quality of the image, and texture information becomes weak or even missing in some areas. For regions with weaker textures, texture feature enhancement is performed, while for regions with missing textures, texture restoration is performed.

As described above, the defect of texture includes an inherent defect that occurred at the time of shooting (a texture defect caused by a photographing angle, light, and the like, which may also be referred to as an objective defect) and an acquired defect that occurred after a digitization process (a texture defect caused by a post-process of an image, such as de-noising, demosaicing in ISP, lossy compression, and the like, which may also be referred to as a subjective defect). According to embodiments of the disclosure, the acquired loss after the digitization process can be optimized, thereby improving the naturalness and rationality of the image.

An embodiment of the disclosure provides an image optimization method that not only recovers lost texture information in an image, but also enhances fragile texture information. The image optimization method may be optimized for a specific region of the image, such as a face region of a human image, a hair region, a garment region, a sky region, a building region, a green planting region, and the like.

For images that need to be restored, the image restoration method may be used. For example, the user may want to remove a certain object in an image. An image restoration method is used to fill a part of a region in an image in a manner so that the filled region meets a visual quality level of a user, and to ensure the authenticity of the restored image as much as possible. For example, for an image, a user may mark a region to be restored, and an image including the marked region may be referred to as a mask map. According to the mask map, the marked region may be restored, and information in the marked region may be restored. Based on the image restoration method described above, certain objects in the image may be removed, or a painting may be restored. However, in such an image restoration method manual markings are used to restore the region, which results in inefficient and inflexible image restoration. In addition, it is impractical to carry out such a manual marking process in an image processing task (e.g., video live broadcasting) that requires real-time performance.

In addition, the above-described image restoration method tends to ignore the image information inside the marked region, and the image information around the marked region is used for image restoration of the marked region. Although the texture information in the marked region may be weaker, the weak texture information may be useful information in the texture restoration process, and there may be some other useful information, such as color, in the marked region that may be helpful for the texture restoration. This useful information may serve as a meaningful guide for the texture restoration. In the existing image restoration method, the information in the marked region is not effectively utilized, so that the restored texture information may be semantically reasonable, but lack of authenticity. In some image processing tasks, the restored image may be poor in quality.

In addition, the image restoration method may recover information in the lost texture region, and may not pay attention to the weak texture region (a region where the texture information is weak). The embodiments of the disclosure propose that the texture details of the weak texture region can be enhanced, and the overall texture quality can be improved. The embodiments of the disclosure can also perform texture restoration and texture enhancement at the same time. In other words, not only a region where texture information is lost and needs to be restored, but also texture details of a weak texture region can be enhanced, thereby improving texture quality of an image as a whole. In this case, an image optimization task can be considered as a mixed task, and a texture restoration task and a texture enhancement task are mixed.

FIG. 1A illustrates a flowchart of an image optimization method 1000 according to an embodiment of the disclosure.

In step S1010, texture quality information indicating a spatial distribution of texture quality in the input image is extracted from an input image.

Figure 7:
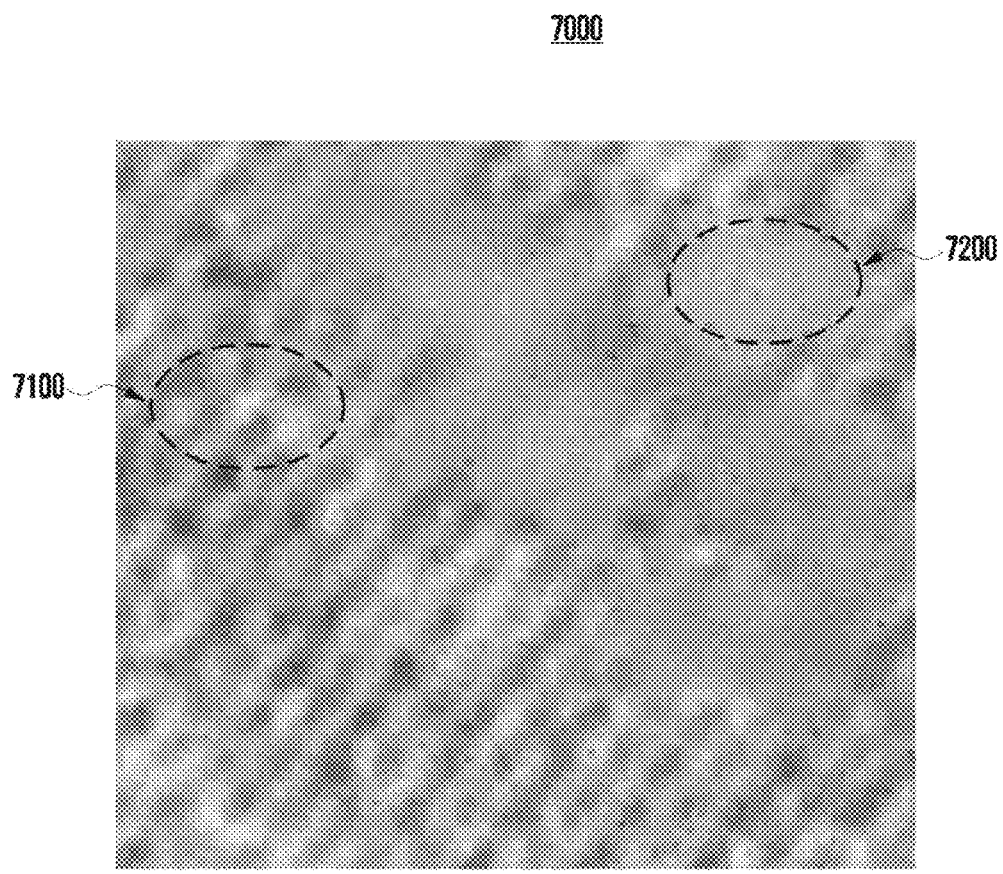
FIG. 7 illustrates a schematic diagram showing texture quality of an input image.

In general, the possibility of overall homogeneity loss of texture of the input image is low. Typically, a portion of the region has a significant loss of texture. In other words, the texture quality is not uniformly distributed in space. The texture quality information indicates the quality of the texture information of the image. Referring to FIG. 7, in the input image 7000, there may be a high texture quality region 7100 where the stripes are clear and a low texture quality region 7200 where the stripes are not clear or even disappear. In the high texture quality region 7100, the stripe has a clear direction and a high sharpness of the stripe pattern. In the low texture quality region 7200, the details of the stripes are visually indistinguishable.

In optimizing the image, it is beneficial to employ different optimization methods for regions where the texture loss is serious and regions where the texture loss is not apparent. This targeted optimization can restore the real image more naturally, thereby achieving a better image optimization effect. Therefore, the disclosure provides a step S1010 of discriminating the texture quality of the input image in advance.

Prediction of the texture quality of the image (which may also be referred to as evaluation of the texture quality of the image) may be considered as evaluation of the texture quality of each pixel in the image. "Good" and "Poor" is a merely a qualitative description. Quantitative judgment is used in actual texture restoration tasks. Therefore, embodiments of the disclosure describe extracting texture quality information from an input image. The texture quality information may be embodied in the form of a texture quality map, which may be considered as a probability map of the degree of texture quality of each pixel, and the degree of texture quality may be further described as the degree of texture loss of the image, that is, the degree of texture weakening relative to the original real texture.

The texture quality map may have the same pixel density as the input image, and the pixel value of each pixel point of the texture quality map represents the texture quality corresponding to the pixel point. The value range of the texture quality information may be, for example, [0, 1], where 0 indicates that the texture is completely lost and 1 indicates that the texture is completely preserved. The texture quality information may be embodied as values between 0 and 1, e.g., 0, 0.2, 0.6, 0.8, and 1, etc.

FIG. 8 illustrates an exemplary embodiment of texture quality information according to an embodiment of the disclosure. The input image 8100 includes a high texture quality region and a low texture quality region. Illustratively, the input image 8100 has the same texture as the input image 7000 described above. The texture quality feature map 8200 containing the spatial distribution of texture quality can be obtained from the input image 8100 by the feature extraction operation described below. The texture quality map 8300 may be generated from the texture quality feature map 8200. As described above, the texture quality map may be one of the implementations of the texture quality information. The texture quality map 8300 may be an array of values representing texture quality. The intersection of rows and columns of the array may also be referred to as a "pixel". The texture quality map 8300 may have the same pixel density as the input image 8100. Alternatively, the pixel density of the texture quality map 8300 may be lower than the pixel density of the input image 8100. Each pixel of the texture quality map 8300 may be a value between 0 and 1. The magnitude of this value may reflect the texture quality of the input image 8100, e.g., the clarity, sharpness, etc., of the texture.

In step S1020 of FIG. 1, texture restoration is performed on the set region in the input image to generate a texture restoration image based on the input image. The set region may be a user-specified region or a region with texture quality below a preset threshold, etc.

As described above, based on the spatial distribution of texture quality, it is beneficial to employ different optimization methods for regions with different texture quality. Therefore, according to the disclosure, it is possible to perform texture restoration on the set region in the input image with the texture quality information as a guide. Such a set region may be discriminated based on the texture quality information extracted in step S1010. For example, the input image and the texture quality information may correspond one-to-one on a pixel-by-pixel basis. The set region in the input image may correspond to a region in the texture quality information where the texture quality is below a predetermined threshold. Embodiments of this disclosure are capable of automatically performing texture quality estimation and automatically performing texture restoration, and can be considered as an active image restoration, which is different from the existing image restoration technology. Given a missing region (commonly referred to as a mask or mask map), image restoration techniques fill pixels of a missing region to achieve consistency in texture and structure as a whole, or to achieve semantic and visual credibility. This technique uses artificially specifying a missing region, and belongs to a passive image restoration. In addition, the pixels of the missing region for image restoration are considered to be invalid pixels in the implementation process, and the pixel information around the missing region and the information of the training sample are used in the image restoration process. Thus, the image content restored by this technique may be semantically reasonable, but lacking authenticity. This is more pronounced when the size of missing regions becomes larger. In contrast, the texture restoration makes use of both the pixel information and the training sample information around the set region, and the information existing in the set region (such as colors and weak texture features) as a guide to restore the texture detail information in the set region, so that the restored image content is more realistic and natural.

Figure 1B:
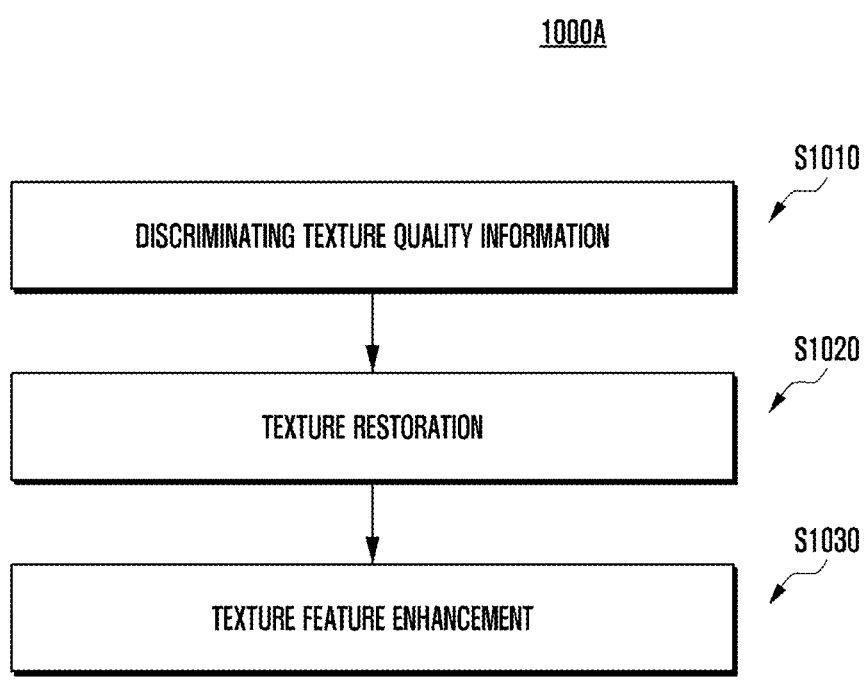
FIG. 1B illustrates a flowchart of an image optimization method according to another embodiment of the disclosure.

Referring to FIG. 1B, the image optimization method 1000A may further include performing texture feature enhancement on the texture restoration image in step S1030. The texture restored image includes both the set region restored in step S1020 and the outer region not restored in step S1020. The texture feature enhancement may be performed for the entire region of the texture restored image, rather than being limited to the region corresponding to the set region. Such texture feature enhancement may include optimization of texture detail features. The image texture of the set region restored in step S1020 mainly utilizes the pixel information around the set region and the existing information inside the set region. The texture around the set region also needs to be enhanced with texture features. Therefore, the texture features of the texture restored region also need to be enhanced.

Optimization of texture detail features may be understood as further enrichment of texture detail information. For example, it may be the case that an indistinct texture is made clearer, a passivated texture detail is made sharper, and the like, such detail changes being advantageous for enhancing the rendering effect on an object.

In certain embodiments, the input image is feature extracted by a neural network, such as a CNN, hereinafter referred to as a first CNN, to obtain the texture quality information. The texture quality can be represented by different texture quality levels, for example, it can be divided into 10 quality levels, with level 1 indicating the worst quality and level 10 indicating the best quality. In this case, the extraction task of the texture quality information described above can be understood as a classification task performed through a CNN, and the texture quality information can be considered as a quality level or quality class map at a pixel level.

In certain embodiments, the texture quality information has two values that of 0 and 1. That is, when the texture quality information is a binary map, the extraction task of the texture quality information is evolved into a two-category classification task at a pixel level, that is, the classification level includes two categories: a good texture (corresponding to 1) and a poor texture (corresponding to 0), although each value in the binary map may be 0 or 1, or may be another two values, such as 0.1 or 0.9. In view of the actual texture quality distribution, the texture quality is not abrupt between good and poor, and there is usually a transition region. In such a case, when the texture quality information has values other than 0 and 1, such as 0.2, 0.4, 0.6, and 0.8, the extraction task of the texture quality information described above evolves into a multi-category classification task (which may also be referred to as a multi-value classification task) at a pixel level. For example, the texture quality information may have pixel values ranging from [0,1]. That is, the texture quality is divided into a plurality of levels, each level corresponding to a category. The number of the categories in such classification tasks determines the degree of refinement in describing the spatial distribution of texture quality. It is noted that the as number of categories increases, the finer the spatial distribution of texture quality will be. When the number of categories is smaller, the spatial distribution of texture quality is coarser.

In actual images, there is generally no mutation between regions of good texture quality and regions of poor quality. In order to obtain accurate texture quality information, fine gradation of texture quality is necessary. Accordingly, multi-class pixel classification by means of a CNN is used.

In certain embodiments, a multi-valued effect of texture quality information can also be realized by a binarized effect. When the texture quality information is a binary image (that is, the texture quality information is binary information), the texture quality information at the boundary of the binary value in the image (which may also be referred to as the boundary position of the weak texture region or the transition region) may be smoothed, and a smoothing processing method such as filtering processing may be used. The value at the boundary after the smoothing processing may be between binary values. This value can be understood as a transition quality rating between good quality and poor quality. By the smoothing process, the classification task can be easily practiced, and the transition between the regions in the texture quality information can be made more realistic, thereby improving the effect of subsequent texture restoration. Further, by the smoothing process described above, it is considered that the binarized graph is processed as a multi-valued graph. It should be noted that the above-mentioned processing method provides one practical and easy-to-operate classification practice, but the extraction of image texture quality information is not limited to this method. In practical applications, the appropriate number of categories can be selected according to the specific requirements of the image optimization task.

The texture quality map in embodiments of the disclosure may also be referred to as a mask map.

The specific structure of the first CNN is not particularly limited. Any CNN that enables pixel-level classification may be employed, such as SegNet for semantic segmentation and variants thereof.

In certain embodiments, step S1020 is performs texture restoration to the weak texture quality region in the input image by using an improved partial convolution using the second CNN. The partial convolution means that when a convolution operation is performed on a pixel position of an image, not all pixels around the pixel corresponding to the convolution kernel matrix are involved in the convolution operation. The improved partial convolution means that when a convolution operation is performed on a pixel position of an image, all pixels around the pixel corresponding to the convolution kernel matrix are involved in the convolution operation, but the degree of participation is different. The different degree of participation means that each pixel participates in the convolution operation according to a certain weight. Each pixel value on the texture quality information obtained by the first CNN can be understood as the initial convolutional weight of the corresponding pixel on the image.

The input to the second CNN is the extracted texture quality information and the input image. The second CNN may adopt a Unet network architecture. The Unet network is a U-shaped CNN, including feature extraction and up-sampling fusion. The convolution operation may be performed in a specific manner of the prior art, and relevant details are not described herein.

The feature extraction portion of the second CNN includes a plurality of network layers, and the input to each network layer is a mask map and a feature map updated by the previous network layer. The input to the first network layer is a mask map extracted by S1010 and the input image. Each layer first performs a point multiplication operation on the input mask map and the input feature map, and then performs a convolution operation on the feature map obtained by the point multiplication operation. The input mask map is also updated by a convolution operation in which the convolution kernel matrix is constant, and the updated mask map and the convolutional feature map are input to the next network layer.

The structure of the up-sampling fusion part and the feature extraction part of the second CNN are substantially consistent. For example, the number of layers included in the up-sampling fusion part and the feature extraction part are consistent, and the operation mode of the convolution operation and the updating mode of the mask of the up-sampling fusion part are consistent with that of the feature extraction part. However, with regard to up-sampling fusion part and the feature extraction part, the convolution kernels of the images are different, and the inputs to each layer are different. The input includes the mask map updated from the previous network layer, and the concatenation of the feature map updated from the previous network layer and the feature map at the corresponding layer level of the feature extraction part.

In the conventional partial convolution operation, either the texture or image information of the outer periphery of the region to be restored is used for image padding or restoration of the region to be restored. Specifically, in the conventional partial convolution operation, the mask map used is composed of a binarized mask. That is, each pixel value is 0 or 1. The region where the pixel value is 0 is actually processed as an empty hole without useful information. However, in the actual image, the weak-texture region is not an empty hole, and image information such as texture and color exists in the weak-texture region. If the image information is directly described by a value of 0, when the region is partially convolution, the effective image information is not utilized, rather the information around the set region is used for restoration. The contents of the restoration may be semantically reasonable, but lack of authenticity, thereby affecting the restoration effect.

The following formula (1) is a method for updating a mask map of any layer in a conventional partial convolution technique, wherein the mask map used is a binarized mask map. Such updating method adopts a "one-size-fits-all" manner, wherein the pixel value of the mask in the set region is zero.

$$m' = \begin{cases} 1 & \text{if sum}(M) > 0 \\ 0 & \text{else} \end{cases} \qquad \text{Formula (1)}$$

M' is any pixel value in the pixel value matrix corresponding to the updated mask map, and M is a pixel value region (also referred to as a pixel value submatrix) in the pixel value matrix corresponding to the updated mask map that performs a convolution operation when any of the pixel values is convolved. sum(M) refers to the sum of pixel values in the pixel value sub-matrix.

As can be seen from the above, if any pixel value in the pixel value sub-matrix is 1, the updated pixel value is 1. If all pixel values in the pixel value sub-matrix are 0, the updated pixel value is 0.

However, for many actual image optimization tasks, even in the set region, the image texture of most of the pixels is not completely missing. In addition, the color information in the set region is also important guide information for texture restoration. Therefore, the image information inside the set region is still of utility value.

Figure 9:
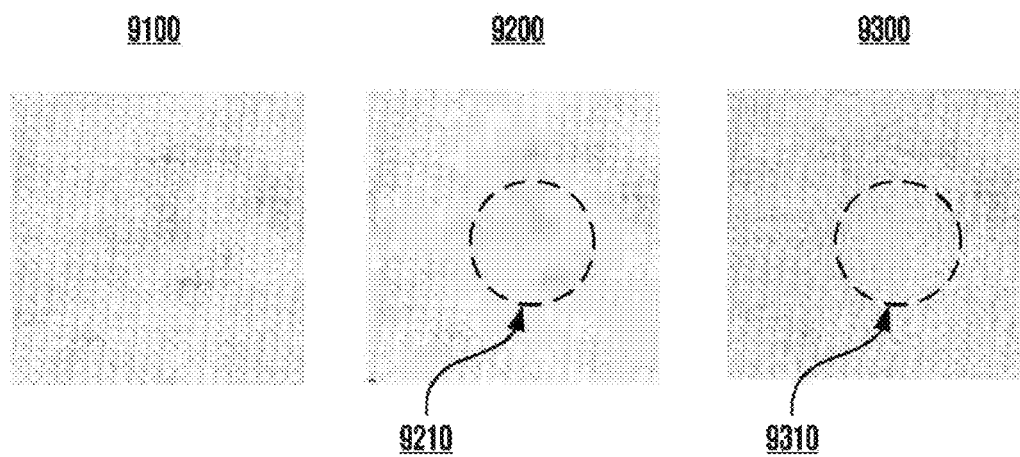
FIG. 9 illustrates a schematic diagram showing texture information inside a set region.

FIG. 9 illustrates a schematic diagram showing how to use texture information in the set region. The original image 9100 is a texture-clear ground truth image. The input image 9200 may be an image corresponding to the original image 9100. In the input image 9200, the texture details in the region 9210 are blurred due to the acquired loss after the digitization process (such as a texture loss due to image de-noising, mosaic processing, lossy compression, and the like). However, even in the regions 9210 where texture details are unclear, the image texture is not completely missing. In addition, such regions still contain color information (not shown in the drawings). These incomplete texture information and color information play an important role in texture restoration. FIG. 9 also shows a restored image 9300 restored without using the information in the region 9210 described above. As can be seen from the restored image 9300, the contents of the restored region 9310 in the restored image 9300 may be semantically reasonable, but the authenticity is not good when the image is restored using the information around the region 9210 and ignoring the information in the region 9210.

To solve the above problem, an embodiment of the disclosure proposes an improved partial convolution in which both the image information inside the set region and the image information outside the set region are used to restore the texture of the set region during the convolution process. In particular, in the improved partial convolution operation proposed in the disclosure, the mask map includes the multi-valued attribute, i.e., multi-valued information, which may also be referred to as a multi-valued map. Even in the set region, the pixel value of the mask map is non-zero, and the value is a weight coefficient by which the pixel corresponding to the image or feature map participates in convolution. Therefore, when the convolution kernel matrix is dot multiplied with the image or feature map, the pixel participates in convolution operation with a certain weight, and the image information of the pixel position is utilized to a certain extent. In other words, the existing image information in the set region is effectively utilized. The degree of utilization of the information for each pixel point within the set region depends on the magnitude of the pixel value of the mask map at the pixel point and the peripheral information outside the set region.

The following formula (2) is an improved manner of updating the mask pattern at any one of the layers in the partial convolution, using a multi-valued mask.

$$m' = \begin{cases} 1 & \text{if } \dfrac{W^T M}{\text{sum}(W)} + M > 1 \\ \dfrac{W^T M}{\text{sum}(W)} + M & \text{else} \end{cases} \qquad \text{formula (2)}$$

M' is any pixel value in the pixel value matrix corresponding to the updated mask map, W is a convolution kernel matrix in which convolution weight parameters are constants (for example, each of which may be 1), and M is a pixel value region (which may also be referred to as a pixel value submatrix) where convolution operations are performed in the pixel value matrix corresponding to the updated mask map when convolution is performed on any one of the pixel values. sum(W) refers to the sum of weights in the convolution kernel matrix.

As can be seen from the above, since the pixel value corresponding to the mask map of the set region is not 0, the texture restoration can be performed by using the existing image information at the corresponding position, thereby improving the authenticity and the natural feeling of the texture restoration.

In this case, in the texture restoration process, not only the image information outside the set region is used as a material for texture restoration of the set region, but also the image information inside the set region is used for texture restoration of the set region. Therefore, the rationality and authenticity of texture restoration are improved, and the image optimization effect is improved.

Figure 10:
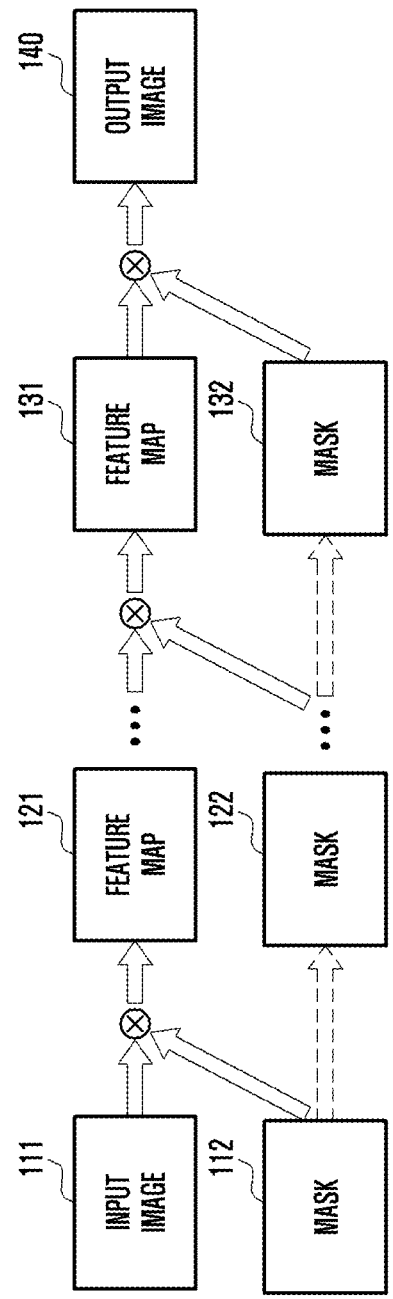
FIG. 10 illustrates a schematic diagram showing a restoration to an image using partial convolution.

FIG. 10 illustrates a schematic diagram showing a restoration of an image using partial convolution. Referring to FIG. 10, the input image 111 is subjected to an element-by-element dot multiplication operation with the mask map 112. As described above, in this process, not only the image information around the set region is used for texture restoration of the set region, but also the image information inside the set region is used for texture restoration of the set region. In other words, the element value of the region corresponding to the set region in the mask map 112 is not 0. The convolution operation generates the feature map 121, and the mask map 112 is similarly updated by a point multiplication operation in which the convolution kernel matrix is constant. The updated mask map 122 and the feature map 121 are dot-multiplied to generate a new feature map, and the mask map 122 is also updated according to the above steps. The feature map 131 and the mask map 132 in the last stage are dot multiplied to generate the restored output image 140.

FIG. 12 illustrates a graph showing a comparison of an improved partial convolution with an existing partial convolution according to an embodiment of the disclosure.

According to the conventional partial convolutional technique, the mask values corresponding to the set region to be restored in the mask map are all 0. Only pixel information and training sample information around the masked region are utilized in the image restoration process. After one or several updates, an initial mask map 11 is updated to a final mask map 12, wherein the mask values within the set region are all updated to 1. Images restored according to this technique may be semantically reasonable in content but lack authenticity. This is more pronounced when the size of missing regions becomes larger.

According to the improved local convolutional technique provided in the disclosure, the mask value corresponding to the set region to be restored in a mask map 21 is not zero, but a non-zero value is assigned, for example, according to the degree of its texture quality. In the texture restoration process as described above with reference to FIG. 10, the texture restoration is performed on the set region in the input image using the texture quality information in the set region and the texture quality information outside the set region based on weights determined by the mask values. During each update, the mask values for each element in the mask map are updated accordingly until all of the values update to 1 in the end (i.e., full restoration).

In certain embodiments, step S1030 is implemented using a residual network. For example, texture feature enhancement may be performed on the texture-restored image using a residual output from the texture restored image and the residual network. Since the residual network fits the residual between the output and the input of the network, the low-frequency component can be ignored and the high-frequency component can be highlighted. Accordingly, the residual network is able to fit the objective function more easily and effectively avoid or mitigate gradient dispersion during training.

In certain embodiments, the residual network includes several convolutional units in cascade. In order to reduce the network models, reduce the calculation burden, and improve the convergence ability during network training, the disclosure proposes that the number of convolutional units can be reduced, and the number of convolutional units smaller than the set number, for example, five convolutional units, can be selected.

Each convolutional unit may comprise several convolutional layers in cascade, embodiments of the disclosure suggest that the above-mentioned cascade mode may be a series mode, a parallel mode or a hybrid mode. The series mode indicates that a convolutional layer is concatenated with another convolutional layer in series. The parallel mode indicates that each convolutional layer are arranged in parallel and the result of the convolution operation is combined. The mixing mode is a combination of the series mode and the parallel mode. For example, several convolutional layers concatenated in parallel are further connected in series. In certain embodiments, the convolutional layer is a dilated convolutional layer.

Furthermore, in order to obtain a large receptive field and focus on texture information of different granularities, embodiments of the disclosure suggest that each convolutional unit may adopt a multi-scale convolutional mode. That is, at least two dilated convolutional layers in any one of the convolutional units have different dilated ratios. For example, a combination in which the dilated ratios are (1, 2, 5) may be adopted. Different dilated ratios may correspond to different receptive fields, which may correspond to information of different scales. For example, a larger dilated ratio corresponds to a larger receptive field, and the larger receptive field pays more attention to long-distance information, thereby contributing to obtaining large-scale texture residual. A smaller dilated ratio corresponds to a smaller receptive field, which is more closely related to short distance information, and contributes to obtaining a small-scale texture residual. According to the multi-scale convolutional method, the continuity of the kernel can be ensured, the grid effect of convolution is avoided, and the information of different granularities is concerned. In such a case, the texture residual information of different scales is obtained, thereby greatly improving the image optimization effect. The multi-scale convolutional method described above may also be referred to as a mixed dilated ratio convolutional method.

A network architecture for implementing an image optimization method according to an embodiment of the disclosure is described below with reference to FIG. 2.

Figure 2:
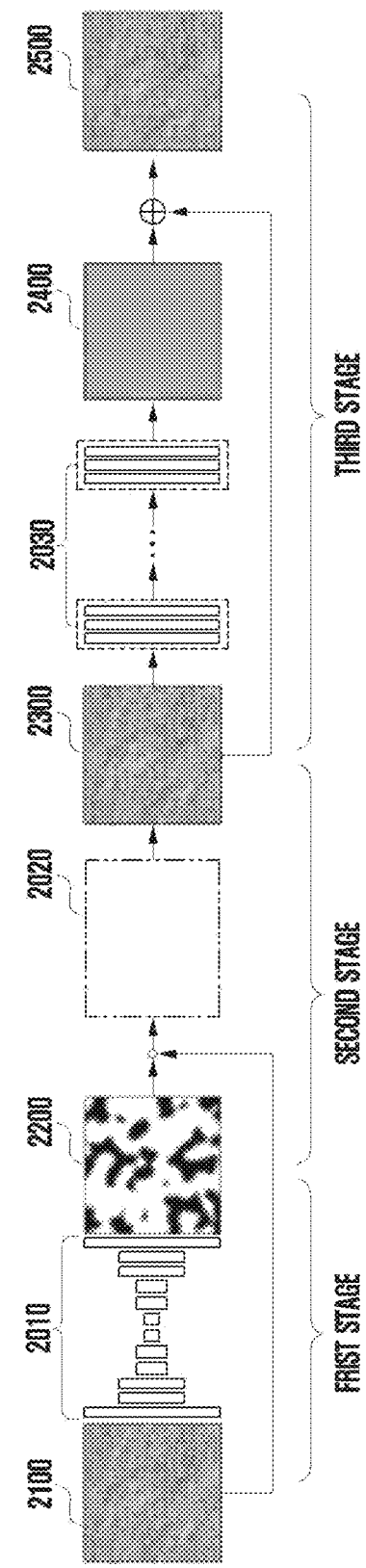
FIG. 2 illustrates a network architecture of an implementation of an image optimization method according to an embodiment of the disclosure.

Referring to FIG. 2, the first CNN 2010, the second CNN 2020, and the residual network 2030 may be sequentially cascaded to implement texture quality information extraction (i.e., the first stage), texture restoration (i.e., the second stage), and texture feature enhancement (i.e., the third stage), respectively. The cascaded network can be considered as an end-to-end neural network, which combines subtasks with different task targets into one network, thereby improving the real-time performance of texture redrawing.

The input image 2100 may be input to the first CNN 2010. The first CNN 2010 performs feature extraction and semantic pixel classification on the input image 2100 to generate texture quality information 2200 indicating a spatial distribution of texture quality in the input image.

Figure 11:
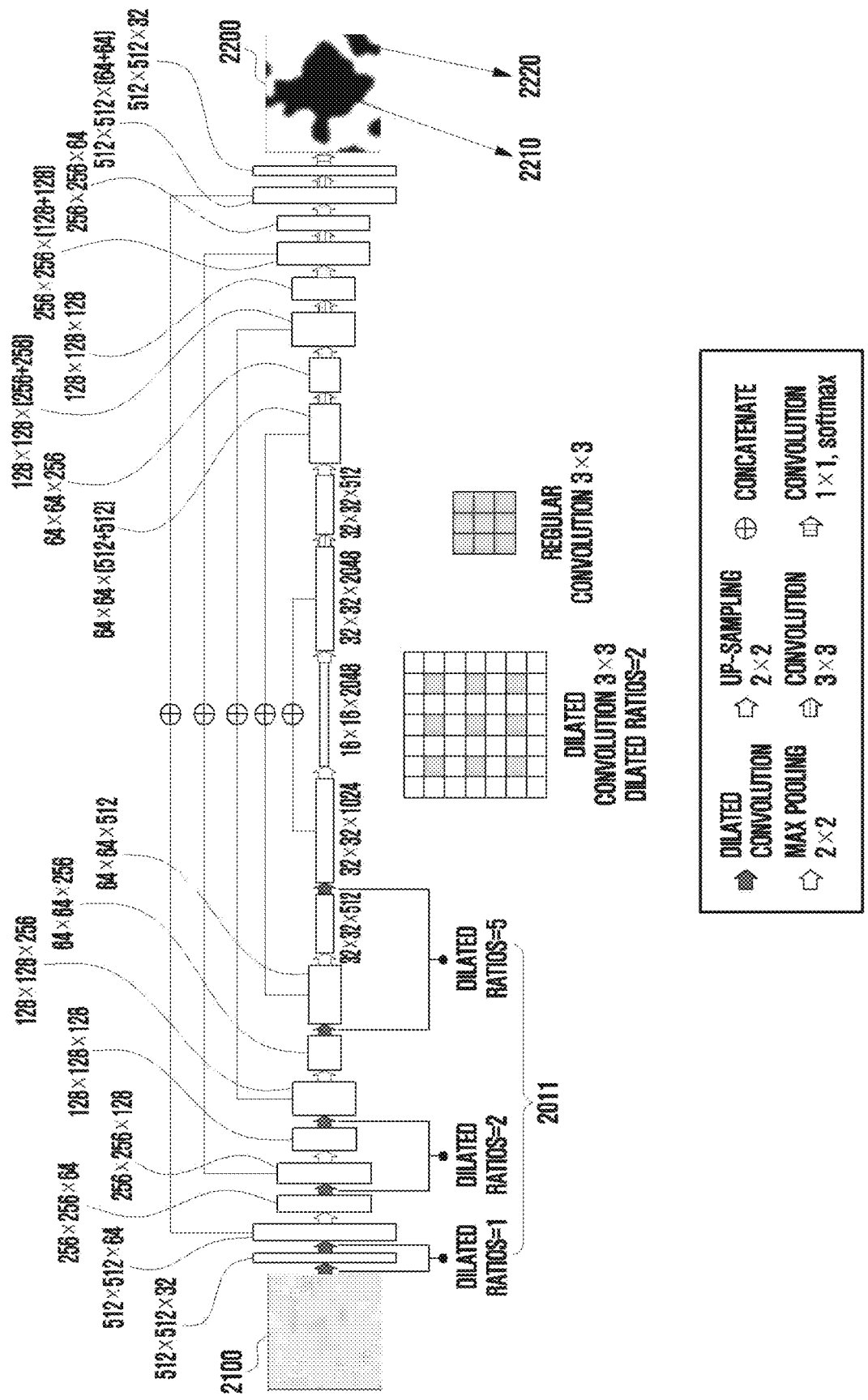
FIG. 11 illustrates a schematic block diagram illustrating a CNN for extracting texture quality information according to an embodiment of the disclosure.

FIG. 11 illustrates a schematic block diagram illustrating a CNN for extracting texture quality information according to an embodiment of the disclosure.

As shown in FIG. 11, the CNN (such as the first CNN 2010 or the second CNN 2020 of FIG. 2) includes an encoder-decoder structure. Each of the encoder and decoder comprises 6 dilated convolutional layers. The positions and dilated ratios of the dilated convolutional layer of the encoder 2011 are indicated by the solid line in the figure.

At least two dilated convolutional layers in the encoder 2011 have different dilated ratios. For example, as shown in FIG. 11, the encoder 2011 includes two dilated convolutional layers having a dilated ratio of 1, two dilated convolutional layers having a dilated ratio of 2, and two dilated convolutional layers having a dilated ratio of 5, respectively.

As shown in FIG. 11, a dilated convolutional layer having a dilated ratio of 2 may increase the lateral and longitudinal dimensions of the convolution kernel by two times each. Different dilated ratios may correspond to different receptive fields, and different receptive fields may correspond to different scales of information. For example, larger dilated ratios may correspond to larger receptive fields, which pay more attention to long-distance information and contribute to obtaining large-scale texture quality information. For example, two dilated convolutional layers with a dilated ratio of 5 can obtain texture quality information of the first region 2210 of a large scale more accurately. Smaller dilated ratios correspond to smaller receptive fields, which are more relevant to short distance information, and contribute to obtaining small-scale texture quality information. For example, two dilated convolutional layers with dilated ratios of 1 and 2 can obtain texture quality information of the second region 2220 of a small scale more accurately. By the above-mentioned multi-scale convolutional method, the continuity of the kernel can be ensured, the convolutional grid effect can be avoided, and information of different granularities can be concerned, so that texture quality information of different scales can be obtained. FIG. 11 also schematically shows the dimensions of the features of the intermediate layer obtained after the convolution process.

Referring back to FIG. 2, the input image 2100 and the texture quality information 2200 are collectively input to the second CNN 2020. The texture quality information 2200 serves as a guide map for texture restoration for indicating a region where texture restoration is performed. The input image 2100 and the texture quality information 2200 may correspond to each other on a pixel-by-pixel basis. The set region in the input image 2100 corresponds to a region where the texture quality in the texture quality information 2200 is lower than a predetermined threshold value. The second CNN 2020 includes a partial convolutional layer to restore the texture in the set region. The restored image is referred to as a texture restored image 2300, which includes both a restored set region and an outer region outside the set region wherein the outer region does not undergo a texture restoration.

The texture restored image 2300 is input to a residual network 2030 for texture feature enhancement. The residual network 2030 includes several (e.g., five) cascaded convolutional units, each convolutional unit including several (e.g., three) cascaded dilated convolutional layers. Each dilated convolutional layer may have a different dilated ratio. For example, dilated ratios may be a combination of (1, 2, 5), i.e., each convolutional unit is successively cascaded from three dilated convolutional layers with dilated ratios of 1, 2, and 5, respectively. In addition, an edge fill operation may be performed before each convolutional layer. The convolutional unit described above may also be referred to as a composite dilated convolutional unit.

With this network configuration, it is possible to obtain a larger receptive field using fewer convolutional layers, thereby making better use of a larger range of texture information and obtaining a more significant enhancement effect. The idea of residual is applied in the texture feature enhancement process, and texture feature enhancement is performed by using the texture restored image 2300 and the residual 2400 output from the residual network to generate the final enhanced image 2500. As described above, the application of the residual can ignore the low frequency component and highlight the high frequency component, thereby effectively avoiding or alleviating the gradient vanishing phenomenon in the training.

The image optimization method and the corresponding network architecture provided in the disclosure are organically combined with the discrimination of texture quality, the texture restoration and the texture feature enhancement, so that texture restoration can be performed direct to a certain target.

Generally, the network architecture described above may be applied in actual applications after a training process. To train the network architecture, a set of training samples may be established. The training sample set includes training samples and ground truth images paired with each other. Each training sample may be obtained by preset degradation of the ground truth image. For example, a suitable degradation model may be designed for a ground truth image to obtain training samples with local texture blurred.

Figure 5:
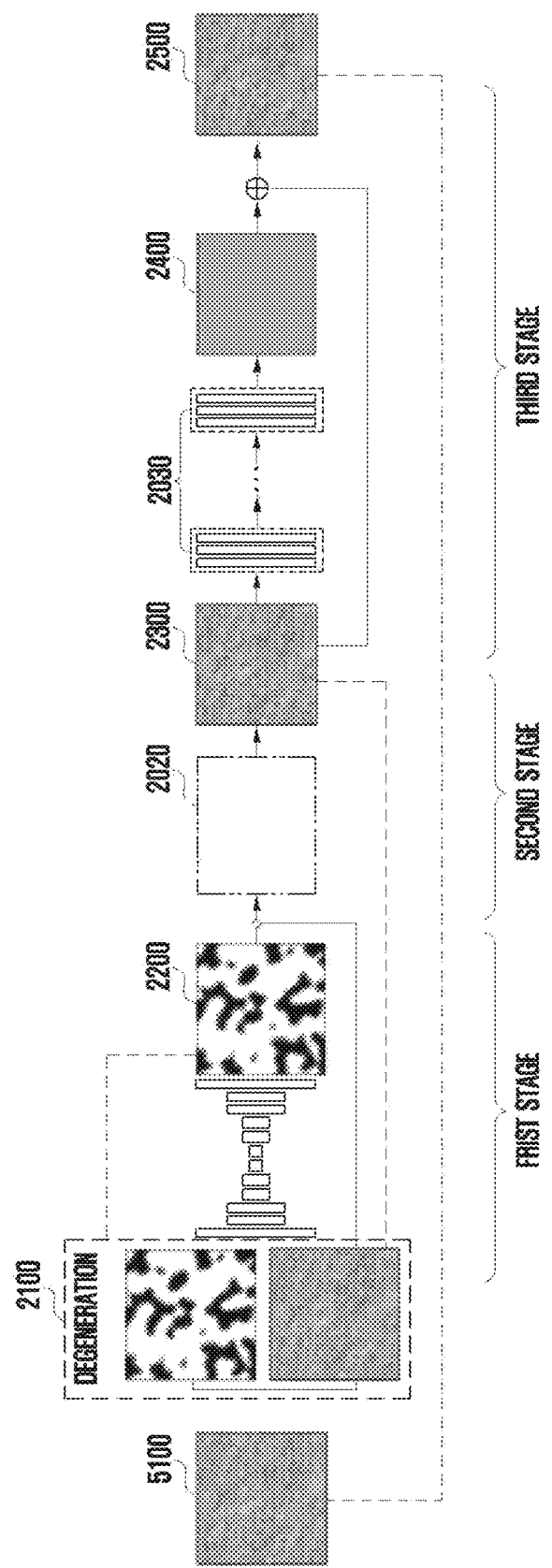
FIG. 5 illustrates a schematic diagram of a training network architecture according to an embodiment of the disclosure.

As shown in FIG. 5, the high definition texture picture 5100 as a ground truth image may be down-sampled with a random accuracy of s and up-sampled with a scale of 1/s. The accuracy s is generated by a random function, and the range is controlled, for example, between [2,5], which corresponds to image scaling ratios between 2 and 5. The interpolation function used for up-sampling may be any of two interpolation methods, bilinear and bicubic.

Then, a random mask is generated according to the size of the high definition texture picture. The generation of the random mask may be carried out by:
  a) randomly generating a single channel picture having a pixel value between [0,255] and the same size as the high definition texture picture;
  b) Gaussian blurring the single channel picture, the window size of the blurred picture being related to the size of the high definition texture picture (e.g., when the size of the high definition texture picture is 512×512, the size of the blurred window is 15×15);
  c) localizing a contour line with a value of 127 for the blurred picture in step b), and filling a pixel value 255 inside the contour and a pixel value 0 outside the contour;
  d) Gaussian blurring a new single-channel picture resulting from step c), the size of the blurred window being the same as in step b); and
  e) normalizing the blurred picture in step d).

After the random mask is generated, the high-definition texture picture is degraded. The degradation process may be carried out by:
  a) converting a high-definition textured picture from an RGB color pattern to a YUV color model;
  b) constructing Y'=Y, and uniformly blurring the luminance component of the YUV color model twice;
  c) constructing $Y^{NEW}=Y(1-M)\cdot Y'$, wherein M is a random mask generated by the above step;
  d) reconverting the $Y^{NEW}$=UV color model into a RGB picture.

Finally, Gaussian noise and Poisson noise are added to the texture degraded picture.

With the above steps, the training sample-ground truth image pairs may be generated one by one, and the training sample-ground truth images may constitute a training sample set.

When the network has a deeper structure, gradient vanishing may easily occur during training. The disclosure proposes a phased training mechanism to improve training efficiency.

According to an embodiment of the disclosure, the first CNN may first be trained using a first loss function. The first loss function may be a cross entropy between the mask used for texture quality information extraction and the random mask used in designing the degradation model.

After the training to the first CNN is completed, the parameters of the first CNN may be fixed. Thereafter, the second CNN is trained using a second loss function. The second loss function may be the distance (L1) between the texture restoration result of the second stage and the degradation model of the first stage and the total change loss.

After the training to the second CNN is completed, the parameters of the second CNN may be fixed. At this time, the parameters of the first CNN remain fixed. Thereafter, the residual network is trained using a third loss function. The third loss function is the loss of mean square error of the final output and the undegraded input image.

According to an embodiment of the disclosure, a phased training as described below may also be performed.

The first CNN is first trained using a first loss function. The first loss function may be a cross entropy between the mask used for texture quality information extraction and the random mask used in designing the degradation model. Then, after the training of the first CNN is completed, the parameters of the first CNN are fixed and the second CNN and the residual network are trained using a joint loss function. The joint loss function refers to a combination of a second loss function and a third loss function, where the combination may be a linear combination of the second loss function and the third loss function, and the linear ratio may be set to 0.5, for example.

Figure 3:
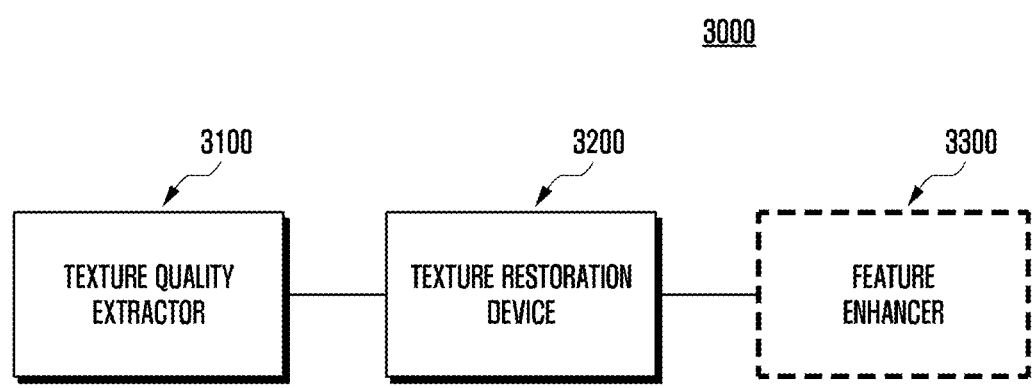
FIG. 3 illustrates a schematic diagram of an image optimization apparatus according to an embodiment of the disclosure.

FIG. 3 illustrates a schematic diagram of an image optimization apparatus 3000 according to an embodiment of the disclosure.

The image optimization apparatus 3000 includes a texture quality extractor 3100 for extracting texture quality information from an input image, the texture quality information indicating a spatial distribution of texture quality in the input image; and a texture restoration device 3200 performing texture restoration on the set region in the input image to generate a texture restored image based on the input image, the set region corresponding to a region where the texture quality in the texture quality information is lower than a predetermined threshold value. The image optimization apparatus 3000 may also include a texture feature enhancer 3300 to perform texture feature enhancement on the texture-restored image. The texture feature enhancer 3300 is configured to perform overall texture feature enhancement to the texture-restored image, thereby enhancing or further enriching the texture detail information of the image.

Figure 6:
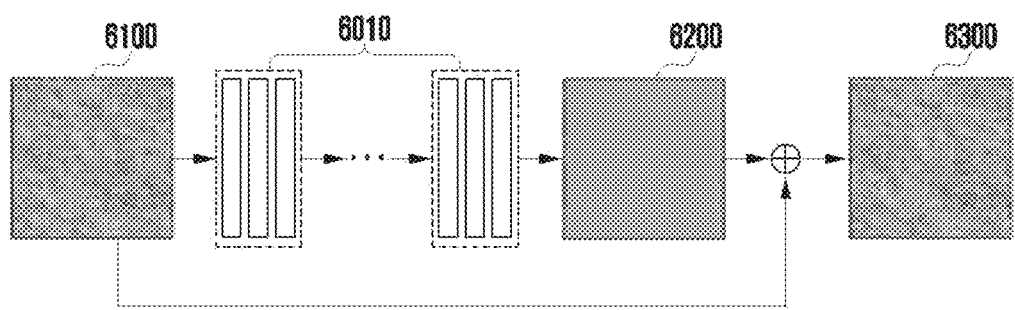
FIG. 6 illustrates a network architecture of an implementation of an image optimization method according to an embodiment of the disclosure.

FIG. 6 illustrates a network architecture of a texture feature enhancement method according to an embodiment of the disclosure.

According to the disclosure, texture feature enhancement of the input image 6100 may be performed by using the input image 6100 and a residual (6200) output by the residual network 6010. Since the residual network 6010 fits the residual between the output and the input of the network, the same components can be ignored to highlight minor variations. Accordingly, the residual network 6010 can fit the objective function more easily and effectively avoid or mitigate gradient vanishing during training.

In certain embodiments, the residual network 6010 includes a plurality of concatenated convolutional units. In order to reduce the network models, reduce the calculation burden, and improve the convergence ability during network training, the disclosure proposes that the number of convolutional units can be reduced, and the number of convolutional units smaller than a set number, for example, five convolutional units, can be selected. Each convolutional unit may comprise several convolutional layers in cascade. The disclosure proposes that the convolutional layers may be dilated convolutional layers.

The idea of residual is applied in the texture feature enhancement process. The texture feature enhancement is achieved by using the input image 6100 and the residual 6200 output from the residual network to generate the final enhanced image 6300.

In certain embodiments, in order to obtain a larger receptive field and pay attention to information of different granularities at the same time, each convolutional unit adopts a multi-scale convolutional mode. In other words, at least two dilated convolutional layers in any one of the residual network 6010 may have different dilated ratios. The different dilated ratios may correspond to different sensing fields, and the different receptive fields may correspond to information of different scales. For example, the larger dilated ratios correspond to the larger receptive fields, and the larger receptive fields pay more attention to long-distance information, thereby contributing to obtaining a large-scale texture residual. Smaller dilated ratios correspond to smaller receptive fields, which are more closely related to short distance information, and contribute to obtaining a small-scale texture residual. According to the multi-scale convolutional method, the continuity of the kernel can be ensured, the grid effect of convolution is avoided, and the information of different granularities is concerned, so that the texture residual information of different scales is obtained, thereby greatly improving the image optimization effect.

Based on the technical solution provided in the disclosure, at least one of the following beneficial effects can be obtained. The texture restoration can be performed by using automatically extracted texture quality information as a guide without manual intervention. The texture restoration and the texture enhancement can be integrated into an end-to-end network for integration optimization and learning so that some real-time image processing tasks can be accomplished. The image restoration can be performed by using the image information inside the region to be restored and the image information outside the region to be restored, thereby improving the accuracy of image restoration. More abundant texture information can be obtained by texture enhancement. The effect of image optimization is improved by using dilated convolutional layers with different dilated ratios while paying attention to information of different granularity.

Figure 4:
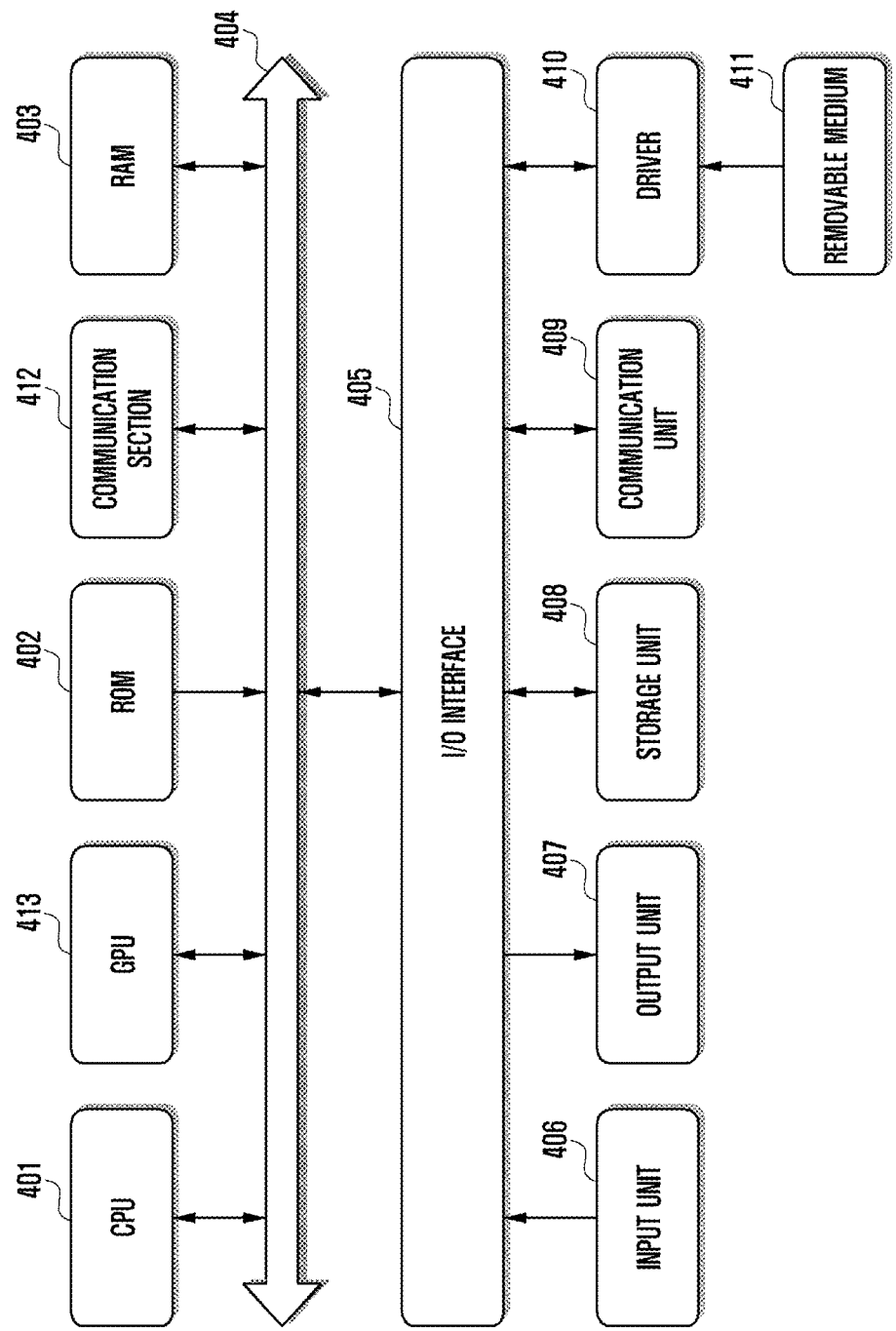
FIG. 4 illustrates a schematic diagram of an image optimization system according to an embodiment of the disclosure.

The disclosure provides a computer system, which may be, for example, a mobile terminal, a personal computer (PC), a tablet computer, a server, or the like. Referring to FIG. 4, which illustrates a schematic structural diagram of a computer system suitable for implementing a terminal device or server of the disclosure. As shown in FIG. 4, the computer system includes one or more processors such as one or more central processing units (CPUs) 401 (e.g., an application processor), and/or one or more graph processing units (GPUs) 413, etc. The Processor may perform various appropriate actions and processes in accordance with an executable instruction stored in a read-only memory (ROM) 402 or an executable instruction loaded into a random access memory (RAM) 403 from a storage unit 408. The communication section 412 may include, but is not limited to, a network card, which may include, but is not limited to, an Infiniband (IB) network card.

The processor may communicate with the ROM 402 and/or the random access memory 403 to execute executable instructions, which may be connected to the communication section 412 via the bus 404 and communicate with other target devices via the communication section 412 to perform operations corresponding to any of the methods provided in embodiments of the disclosure, such as extracting texture quality information from an input image, the texture quality information indicating a spatial distribution of texture quality in the input image; and performing, according to the texture quality information, texture restoration on a set region in the input image to generate a texture restored image. For another example, the method may include: acquiring an input image; and performing texture feature enhancement on the input image via a residual network by using a residual output by the residual network and the input image.

In addition, in the RAM 403, various programs and data used for operation of the device may be stored. The CPU 401, the ROM 402, and the RAM 403 are connected to each other through the bus 404. Where the RAM 403 exits in the system, the ROM 402 is an optional module. The RAM 403 stores an executable instruction or writes the executable instruction to the ROM 402 at runtime, and the executable instruction causes the CPU 401 to perform the operation corresponding to the method described above. An input/output (I/O) interface 405 is connected to bus 404. The communication section 412 may be provided integrally, or may be provided with a plurality of sub-modules (e.g., a plurality of IB network cards). The communication section 412 is also linked by the bus.

The following components are connected to the I/O interface 405: An input unit 406 including a keyboard, a mouse, and the like; an output unit 407 including a cathode ray tube (CRT), a liquid crystal display (LCD), and a speaker; a storage unit 408 including a hard disk or the like; and a communication unit 409 including a network interface card such as a LAN card, a modem, or the like. The communication unit 409 performs communication processing via a network such as the Internet. The driver 410 is also connected to the I/O interface 405 as desired. A removable medium 411, such as a magnetic disk, an optical disk, a magneto-optical disk, a semiconductor memory, or the like, is mounted on the driver 410 so that a computer program read therefrom is written into the storage unit 408 as needed.

It should be noted that the architecture shown in FIG. 4 is only an alternative implementation, and the number and type of the components in FIG. 4 can be selected, deleted, added or replaced according to actual requirements in a specific practice. Implementations such as a distributing arrangement or an integrated arrangement may be used for different functional component settings. For example, the GPU and the CPU may be provided separately, or the GPU may be integrated on the CPU. The communication section may be provided separately, or the communication section may be provided integrally on the CPU or the GPU. All of these alternative embodiments fall within the scope of protection disclosed herein.

In addition, in accordance with embodiments of the disclosure, the process described above with reference to the flowchart may be implemented as a computer software program. For example, the disclosure provides a non-transitory machine-readable storage medium storing machine-readable instructions that can be executed by a processor to perform instructions corresponding to method steps provided in the disclosure, such as extracting texture quality information from an input image, the texture quality information indicating a spatial distribution of texture quality in the input image; and performing, according to the texture quality information, texture restoration on a set region in the input image to generate a texture restored image. For another example, the method may include acquiring an input image; and performing texture feature enhancement on the input image via a residual network by using a residual output by the residual network and the input image. In such an embodiment, the computer program may be downloaded and installed from the network through the communication unit 409, and/or installed from the removable medium 411. When the computer program is executed by the central processing unit (CPU) 401, the above functions defined in the method of the disclosure are performed.

The method, device and apparatus of the disclosure may be implemented in many ways. For example, the methods and apparatus, devices of the disclosure may be implemented in software, hardware, firmware, or any combination of software, hardware, and firmware. The order of steps illustrates in the process is for the purpose of illustration only, and the steps of the process of the disclosure are not limited to the order specifically described above unless specifically stated otherwise. Furthermore, in some embodiments, the disclosure may also be implemented as a program recorded in a recording medium, the program including machine-readable instructions for implementing the method according to the disclosure. Thus, the disclosure also covers a recording medium storing a program for executing the method according to the disclosure.

The description of the disclosure is given for purposes of illustration and description, and is not intended to be interpreted to be exhaustive or to limit the disclosure to the disclosed embodiments. Many modifications and variations will be apparent to those of ordinary skill in the art. The embodiments were chosen and described in order to illustrate the principles and practical applications of the disclosure, and to enable those of ordinary skill in the art to understand the disclosure so as to design various embodiments with various modifications suitable for a particular use.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating an electronic device, the method comprising:
   acquiring an input image;
   extracting texture quality information from the input image, the texture quality information indicating a spatial distribution of texture quality in the input image, wherein the texture quality information indicating the spatial distribution of texture quality is embodied in the input image as a texture quality map or a probability map of a degree of texture quality of each pixel forming the input image;
   based on the texture quality information, setting a region to be restored in the input image; and
   performing texture restoration on the set region in the input image, using image information inside the set region and image information outside the set region,
   wherein texture quality within the set region is lower than a preset threshold value, and
   wherein the image information inside the set region used for the texture restoration comprises texture quality information and a color.

2. The method of claim 1, wherein extracting the texture quality information from the input image comprises:
   performing feature extraction on the input image through a first convolutional neural network (CNN) to obtain the texture quality information.

3. The method of claim 1, wherein the texture quality information includes a value between 0 and 1.

4. The method of claim 1, wherein the texture quality information of a boundary position of the set region is smoothed when the texture quality information is binarization information.

5. The method of claim 1, wherein performing the texture restoration comprises:
   performing the texture restoration on the set region through a second CNN based on the texture quality information.

6. The method of claim 1, further comprising performing texture feature enhancement on the restored texture of the input image.

7. The method of claim 6, wherein performing the texture feature enhancement comprises performing the texture feature enhancement on the restored texture of the input image via a residual network using the restored texture of the input image and a residual output by the residual network.

8. The method of claim 7, wherein the residual network comprises concatenated convolutional units.

9. The method of claim 8, wherein any one of the concatenated convolutional units of the residual network comprises a plurality of concatenated dilated convolutional layers.

10. The method of claim 9, wherein at least two dilated convolutional layers of the plurality of concatenated dilated convolutional layers include different dilated ratios.

11. An electronic device comprising:
a first processor; and
a memory connected to the first processor configured to store machine-readable instructions that when executed by the first processor to cause the first processor to:
acquire an input image,
extract texture quality information from the input image, the texture quality information indicating a spatial distribution of texture quality in the input image, wherein the texture quality information indicating the spatial distribution of texture quality is embodied in the input image as a texture quality map or a probability map of a degree of texture quality of each pixel forming the input image,
based on the texture quality information, set a region to be restored in the input image, and
perform texture restoration on the set region in the input image, using image information inside the set region and image information outside the set region,
wherein texture quality within the set region is lower than a preset threshold value, and
wherein the image information inside the set region used for the texture restoration comprises texture quality information and a color.

12. The electronic device of claim 11, further comprising a second processor configured to process an image,
wherein the instructions that when executed by the first processor further cause the first processor to acquire the input image from the second processor.

13. A non-transitory machine-readable storage medium comprising machine-readable instructions that when executed by a processor to cause the processor to:
acquire an input image,
extract texture quality information from the input image, the texture quality information indicating a spatial distribution of texture quality in the input image, wherein the texture quality information indicating the spatial distribution of texture quality is embodied in the input image as a texture quality map or a probability map of a degree of texture quality of each pixel forming the input image,
based on the texture quality information, set a region to be restored in the input image, and
perform texture restoration on the set region in the input image, using image information inside the set region and image information outside the set region,
wherein texture quality within the set region is lower than a preset threshold value, and
wherein the image information inside the set region used for the texture restoration comprises texture quality information and a color.

* * * * *